R. T. SMITH, J. K. PRIEST & W. EARL.
ANIMAL SHEARING MACHINE.
No. 104,222. Patented June 14, 1870.
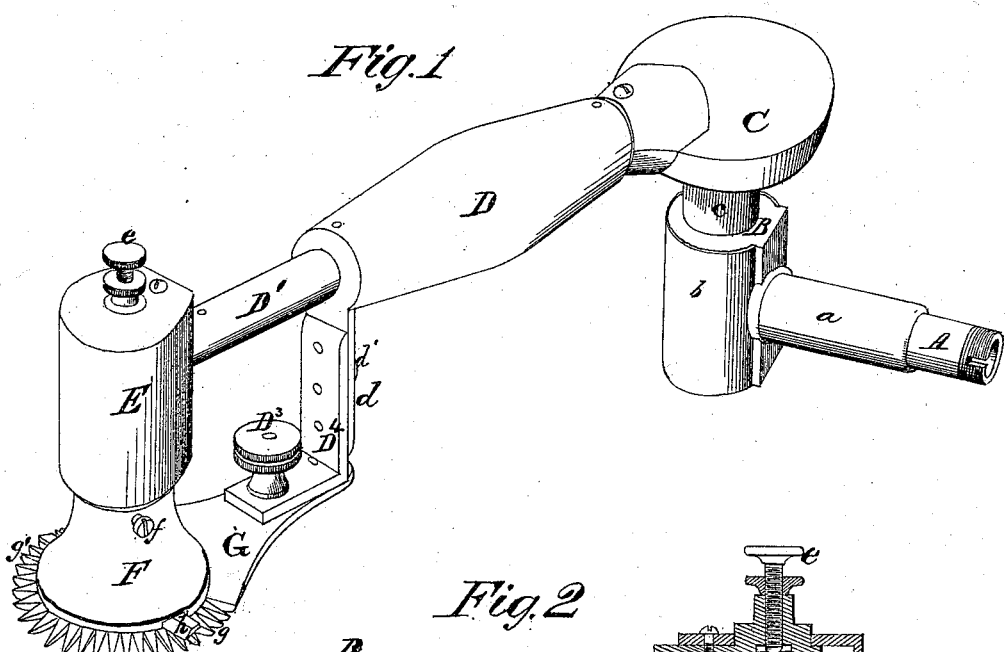
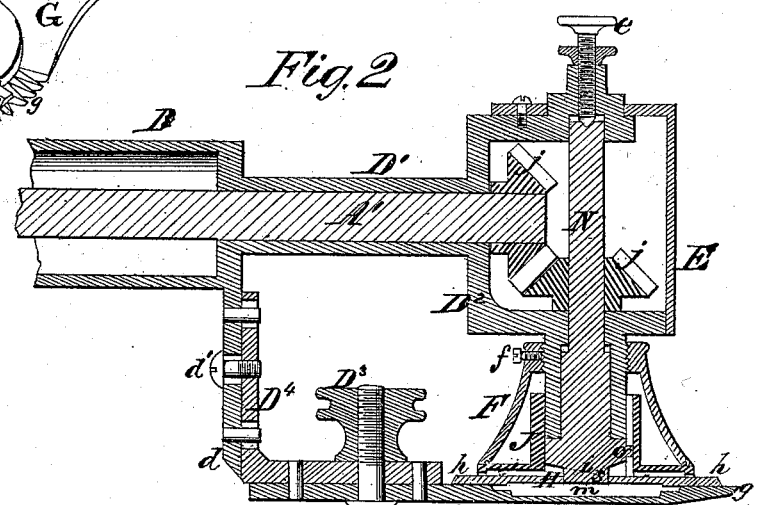
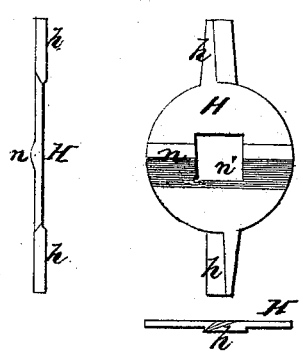
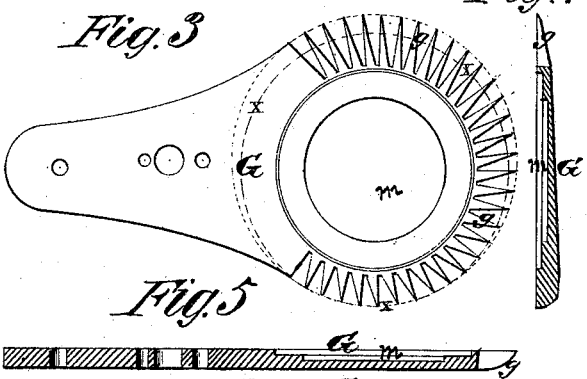

United States Patent Office.

ROSWELL T. SMITH, JOSEPH K. PRIEST, AND WILLIAM EARL, OF NASHUA, NEW HAMPSHIRE.

Letters Patent No. 104,222, dated June 14, 1870.

IMPROVEMENT IN ANIMAL-SHEARING MACHINE.

The Schedule referred to in these Letters Patent and making part of the same

*To all whom it may concern:*

Be it known that we, ROSWELL T. SMITH, JOSEPH K. PRIEST, and WILLIAM EARL, of Nashua, in the county of Hillsborough and State of New Hampshire, have invented a new and improved Animal-shearing Machine; and we do hereby declare that the following is a full, clear, and exact description thereof, reference being had to the accompanying drawing making part of this specification, in which—

Figure 1 is a perspective view of the improved shearing-machine.

Figure 2 is a diametrical section through the cutting apparatus, and part of the frame which receives and supports the same.

Figures 3, 4, and 5, show the construction of the cutter-guard.

Figures 6 are views of the cutter.

Similar letters of reference indicate corresponding parts in the several figures.

This invention relates to certain novel improvements, which are applicable to the animal-shearing machine referred to in the schedules annexed to Letters Patent of the United States, numbered respectively 59,089, 66,052, 72,013, and 88,340.

The nature of our invention consists—

First, in making the guard which incloses the cutter carrying shield adjustable to such shield, in such manner that the joint between these parts can be kept sufficiently close to prevent the entrance of wool or hairs between them, as will be hereinafter explained.

Second, in the construction of the cutter-guard with teeth of different lengths, and in so applying the revolving cutter to such a guard that the points or ends of the teeth shall extend beyond the ends of the cutters, and thereby operate as protections to the animal against being cut, as will be hereinafter explained.

Third, in the employment of a self-adjustable cutter, in conjunction with a cutter-guard, whereby the cutting-edges of said cutter will adapt themselves to the surfaces over which they move, and wear truly thereon, as will be hereinafter explained.

To enable others skilled in the art to understand our invention, we will describe its construction and operation.

A represents a shaft, which, when rotated by a device not shown in the drawing, communicates rotary motion to the cutter-shaft N, through the mediums of shafts and bevel spur-wheels, that are inclosed within the case of the instrument.

*a* is a tube, which incloses the tubular frame of shaft A.

*b* is a removable case, which incloses two beveled spur-wheels, not shown.

C is a case, which incloses the spur-wheels that turn shaft A′; and

E is a case, which incloses part of frame $D^2$ and the spur-wheels $j\ j$.

The handle D, and tubular bearing $D^1$, inclose the shaft A′. The case C and frame of shaft A are so connected to the handle D and shaft A′ that a free universal articulation of these parts is allowed, in order that the instrument may be conveniently manipulated during the act of shearing an animal.

The cutter-shaft N extends below the tubular extension of frame $D^2$, and, by means of a key-tenon, O, gives rotation to the shield J and cutter-plate H.

The end, *s*, of the cutter-shaft N is prismatic, and on it the cutter-plate H is placed and held when the cutter-guard G is in place, as shown in fig. 2.

The shoulder on the bottom of the shaft N, against which the elevation *n* on the cutter-plate H abuts, is beveled or rounded, as at *i*, fig. 2, so as to allow the said plate to balance or rock on or near its center, and thus cause the cutting-edges to adapt themselves snugly to the surface of the cutter-guard with an equal pressure.

It is obvious that the same result would be obtained by having the ridge *n*, on the upper surface of the cutter-plate H, bear against a flat surface on the lower end of the shaft N, or both impinging sur faces may be ridged, as indicated in dotted lines in fig. 2.

The guard F, which above the annular flange of the shield J, is made adjustable on the lower tubular extension of the frame $D^2$, by means of a screw on this extension, and can be fixed in place by the set-screw *f*.

This guard is made adjustable, in order that the joint between its lower flaring edge and the flange of shield J may be kept sufficiently close to prevent the entrance of any foreign substance through it.

The cutter-plate H has two cutters, $h\ h$, formed on it, diametrically opposite each other, as shown in fig. 6, and through the center of this plate H a hole, *n′*, is made for receiving the portion *s*, on the lower end of the shaft N.

The cutting-edges of the cutters $h\ h$ are parallel with the surface of the cutter-guard G, as shown in fig. 2.

The shear-cut, which is necessary for the proper working of the device, is secured by cutting the steel away from the lower edge of each cutter, beginning at its cutting-edge, and beveling at an angle that will prevent any part of the cutter, except its cutting-edge, from resting upon the surface of the guard-fingers *g*.

The cutter-guard G is made of steel, with teeth or fingers, *g*, at its sides and front, as shown by figs. 1 and 3.

The fingers or teeth *g*, on one side of this guard, are made longer than the teeth on the opposite side, so that, as the ends of the cutters $h\ h$ sweep around that side where the teeth are longest, the ends of these teeth will serve as guards to prevent the skin of the animal from being cut.

The dotted circle X, fig. 3, indicates the line described by the ends of the cutters $h\ h$. The shortest teeth, $g$, are made much thicker than the longest teeth, in order that the cutters $h$, in sweeping over them, and cutting nearly or quite to their extremities, shall not come in contact with or injure the skin of an animal.

It should be understood that, during the operation of shearing, the instrument is held in the right hand, and moved along the body of the animal with that side of the cutter-guard G having the shortest teeth, next the uncut wool; consequently the teeth $g$ should be made so short that the cutters $h$ will work nearly, if not quite, to their ends, to prevent these ends from dragging in the wool or hair; but, on the opposite side of the cutter-guard G, this objection does not obtain; therefore the teeth $g$, at this side, can be made long enough to afford protection to the animal against the cutters.

The cutter-guard G is recessed at $m$, so that the cutter-shaft N may be adjusted or set down by the screw $e$ without hitting this cutter-guard.

We would here remark that, by concaving the bottom side of the cutter-plate H, we obtain the same result as is obtained by recessing the guard G.

The cutter-guard G may be adjusted up to the cutters by making the bearing-plate $D^4$ adjustable on the arm $d$, as indicated by the set-screw $d'$, fig. 2. This latter adjustment may be adopted in lieu of adjusting the shaft N.

$D^3$ is a nut by which the guard G is secured in its place beneath the cutter-plate H.

In using the machine, an operative presses the cutter-guard flatly against the surface from which the hair or wool is to be cut or sheared, and, as the cutting progresses, he should advance the guard along the path in which it is to travel. He can turn the guard in any direction desired with great facility, and the cutters will continue to revolve and perform their work without liability of injury to the animal.

We herein make no claim to the shearing-machine described and represented in the Letters Patent numbered 59,089, granted to one of the undersigned, viz., ROSWELL T. SMITH, nor do we herein claim the subject or subjects of Letters Patent No. 72,103, or No. 88,340, granted to two of the undersigned, viz., ROSWELL T. SMITH and JOSEPH K. PRIEST.

Having described our invention,

We claim in a shearing-machine, and desire to secure by Letters Patent—

1. Making the guard F adjustable about the shaft N of a revolving sheep-shearing or animal-clipping blade, substantially as and for the purpose described.

2. A cutter-plate H, constructed with beveled cutters $h\ h$ and ridge $n$, substantially as described.

3. A cutter-guard G, constructed with teeth of different lengths, substantially as described.

4. In a sheep-shearing or animal-clipping machine, the revolving cutter-plate H, in combination with a toothed cutter-guard G, which has teeth gradually increasing in length, when the blades, $h$, of the cutter-plate are shorter than the teeth of the cutter-guard, substantially as and for the purpose described.

5. The guard-plate G, made thicker on one side than on the other, substantially as described.

6. The adjustable arm $D^4$, carrying the guard-plate G, substantially as described.

7. So applying the cutter-plate H to its driving-shaft that this plate is allowed to rock and accommodate itself to the guard G, on which it is held by said shaft, substantially as described.

ROSWELL T. SMITH.
    JOSEPH K. PRIEST.
    WM. EARL.

Witnesses:
 W. W. BAILEY,
 M. LAWRENSON.